(12) United States Patent
Yeddu

(10) Patent No.: US 11,120,054 B2
(45) Date of Patent: Sep. 14, 2021

(54) HIERARCHICAL LABEL GENERATION FOR DATA ENTRIES

(71) Applicant: International Business Machines Corporation, Armonk, NY (US)

(72) Inventor: Dinesh Babu Yeddu, Guntur (IN)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 16/432,251

(22) Filed: Jun. 5, 2019

(65) Prior Publication Data

US 2020/0387524 A1    Dec. 10, 2020

(51) Int. Cl.
G06F 17/00    (2019.01)
G06F 7/00     (2006.01)
G06F 16/28    (2019.01)
G06F 16/23    (2019.01)

(52) U.S. Cl.
CPC ........ G06F 16/285 (2019.01); G06F 16/2379 (2019.01)

(58) Field of Classification Search
CPC ............................ G06F 16/285; G06F 16/2379
USPC ........................................................ 707/738
See application file for complete search history.

(56) References Cited

U.S. PATENT DOCUMENTS

| | | | | |
|---|---|---|---|---|
| 5,073,953 A * | 12/1991 | Westdijk | ............ | H04N 1/40062 382/176 |
| 7,185,001 B1 * | 2/2007 | Burdick | ................ | G06F 16/345 |
| 9,262,519 B1 * | 2/2016 | Saurabh | ................ | G06F 16/285 |
| 9,275,127 B1 * | 3/2016 | Liao | ....................... | G06F 16/285 |
| 9,367,814 B1 * | 6/2016 | Lewis | ..................... | G06Q 10/00 |
| 9,946,783 B1 | 4/2018 | Lewis et al. | | |
| 10,210,251 B2 * | 2/2019 | Deshpande | ........... | G06F 16/783 |
| 10,248,712 B1 * | 4/2019 | Cheng | ................... | G06F 16/243 |
| 10,783,167 B1 * | 9/2020 | Dutta | ................. | G06F 16/24578 |
| 2010/0107045 A1 * | 4/2010 | Filippova | .............. | G06F 40/134 715/205 |
| 2014/0108423 A1 * | 4/2014 | Casella dos Santos | ..................... | G06F 16/285 707/748 |
| 2014/0129560 A1 * | 5/2014 | Grokop | ................... | G06N 20/00 707/737 |

(Continued)

OTHER PUBLICATIONS

Blei et al., "Latent Dirichlet Allocation," Journal of Machine Learning Research, vol. 3, 2003, 30 pages.

(Continued)

Primary Examiner — Pavan Mamillapalli
(74) Attorney, Agent, or Firm — Jamar K. Ray (57) ABSTRACT

A computer system for generating a labeling term for a set of data entries may include one or more processors having instructions to obtain a set of data entries and identify a set of unique terms. The program instructions further include instructions to determine a frequency of the unique terms and select a first a subset of unique terms based on the frequency. The program instructions further include instructions to form a set of exclusive groups using the unique terms in the first subset and select a second subset of exclusive groups according to a frequency of each exclusive group. The program instructions further include instructions to form distinct terms from the second subset of exclusive groups and designate a label to a set of data entries using the distinct terms. A computer program product and method corresponding to the above computer system are also disclosed herein.

20 Claims, 8 Drawing Sheets

(56) References Cited

U.S. PATENT DOCUMENTS

| | | | |
|---|---|---|---|
| 2015/0006531 A1 | 1/2015 | Deshpande et al. | |
| 2015/0046151 A1* | 2/2015 | Lane | G06F 16/93 |
| | | | 704/9 |
| 2015/0186420 A1* | 7/2015 | Yan | G06F 16/5866 |
| | | | 707/736 |
| 2015/0317599 A1* | 11/2015 | Davis, Jr. | G06F 16/22 |
| | | | 705/28 |
| 2016/0092553 A1* | 3/2016 | Liu | G06F 16/285 |
| | | | 707/738 |
| 2016/0117379 A1* | 4/2016 | Quercia | G06F 16/285 |
| | | | 707/738 |
| 2016/0217201 A1 | 7/2016 | Hummel et al. | |
| 2018/0068231 A1* | 3/2018 | Sharma | G06F 16/35 |
| 2018/0189387 A1 | 7/2018 | Kim et al. | |
| 2018/0268038 A1* | 9/2018 | Keyngnaert | G06F 16/24578 |
| 2018/0314738 A1* | 11/2018 | Stefik | G06F 16/951 |
| 2019/0138617 A1* | 5/2019 | Farre Guiu | G06F 16/7867 |

OTHER PUBLICATIONS

Manning et al., "An Introduction to Information Retrieval," Online edition (c) @2009 Cambridge UP, 2009, 581 pages.

Role et al., "Beyond cluster labeling: Semantic interpretation of clusters' contents using a graph representation," ScienceDirect, Knowledge-Based Systems, vol. 56, Jan. 2014, 2 pages.

Turney et al., "Learning Algorithms for Keyphrase Extraction," NRC Publications Archive (NPArC), Jul. 2000, 50 pages.

Hammouda et al., "CorePhrase: Keyphrase Extraction for Document Clustering," Pattern Analysis and Machine Intelligence (PAMI) Research Group, Waterloo, CA, Printed May 9, 2019, 10 pages.

* cited by examiner

| # | Exclusive groups | Frequency value |
|---|---|---|
| 1 | ( 'lotus' , 'notes' ) | 0.833 |
| 2 | ( 'issue' , 'notes' ) | 0.833 |
| 3 | ( 'issue' , 'lotus' ) | 0.833 |
| 4 | ( 'password' , 'reset' ) | 0.417 |
| 5 | ( 'notes' , 'reset' ) | 0.417 |
| 6 | ( 'notes' , 'password' ) | 0.417 |
| 7 | ( 'lotus' , 'reset' ) | 0.417 |
| 8 | ( 'lotus' , 'password' ) | 0.417 |
| 9 | ( 'issue' , 'reset' ) | 0.417 |
| 10 | ( 'issue' , 'password' ) | 0.417 |
| 11 | ( 'installation' , 'issue' ) | 0.333 |
| 12 | ( 'configuration' , 'issue' ) | 0.25 |
| 13 | ( 'configuration' , 'lotus' ) | 0.25 |
| 14 | ( 'configuration' , 'notes' ) | 0.25 |
| 15 | ( 'installation' , 'notes' ) | 0.167 |
| 16 | ( 'installation' , 'lotus' ) | 0.167 |
| 17 | ( 'Xenapp' , 'installation' ) | 0.167 |
| 18 | ( 'Xenapp' , 'issue' ) | 0.167 |
| 19 | ( 'installation' , 'password' ) | 0 |
| 20 | ( 'installation' , 'reset' ) | 0 |
| 21 | ( 'configuration' , 'reset' ) | 0 |
| 22 | ( 'configuration' , 'password' ) | 0 |
| 23 | ( 'configuration' , 'installation' ) | 0 |
| 24 | ( 'Xenapp' , 'reset' ) | 0 |
| 25 | ( 'Xenapp' , 'password' ) | 0 |
| 26 | ( 'Xenapp' , 'notes ') | 0 |
| 27 | ( 'Xenapp' , 'lotus' ) | 0 |
| 28 | ( 'Xenapp' , 'configuration' ) | 0 |

331 points to rows 1, 2, 3

| # | Distinct term |
|---|---|
| 1 | issue |
| 2 | notes |
| 3 | lotus |

| # | Entry | Labeling term |
|---|---|---|
| 1 | lotus notes password reset issue | lotus notes issue |
| 2 | lotus notes password reset issue | lotus notes issue |
| 3 | lotus notes password reset issue | lotus notes issue |
| 4 | lotus notes password reset issue | lotus notes issue |
| 5 | lotus notes password reset issue | lotus notes issue |
| 6 | lotus notes configuration issue | lotus notes issue |
| 7 | lotus notes configuration issue | lotus notes issue |
| 8 | lotus notes installation issue | lotus notes issue |
| 9 | lotus notes installation issue | lotus notes issue |
| 10 | lotus notes installation issue | lotus notes issue |
| 11 | Xenapp installation issue | issue |
| 12 | Xenapp installation issue | issue |

| # | Ordered combination | Frequency value |
|---|---|---|
| 1 | issue notes lotus | 0.00 |
| 2 | issue lotus notes | 0.00 |
| 3 | notes issue lotus | 0.00 |
| 4 | notes lotus issue | 0.00 |
| 5 | lotus notes issue | 0.83 |
| 6 | lotus issue notes | 0.00 |

| # | Entry | First label | Entry w/o distinct terms | Second label |
|---|---|---|---|---|
| 1 | lotus notes password reset issue | lotus notes issue | password reset | password reset |
| 2 | lotus notes password reset issue | lotus notes issue | password reset | password reset |
| 3 | lotus notes password reset issue | lotus notes issue | password reset | password reset |
| 4 | lotus notes password reset issue | lotus notes issue | password reset | password reset |
| 5 | lotus notes password reset issue | lotus notes issue | password reset | password reset |
| 6 | lotus notes configuration issue | lotus notes issue | configuration | configuration |
| 7 | lotus notes configuration issue | lotus notes issue | configuration | configuration |
| 8 | lotus notes configuration issue | lotus notes issue | configuration | configuration |
| 9 | lotus notes installation issue | lotus notes issue | installation | installation |
| 10 | lotus notes installation issue | lotus notes issue | installation | installation |
| 11 | Xenapp installation issue | issue | Xenapp installation | Xenapp installation |
| 12 | Xenapp installation issue | issue | Xenapp installation | Xenapp installation |

305 → Entry
390 → First label
392 → Entry w/o distinct terms
395 → Second label

HIERARCHICAL LABEL GENERATION FOR DATA ENTRIES

BACKGROUND

The present disclosure relates to data management, and more specifically, to determining categories for organizing data.

Large quantities of data entries may present challenges to reviewing the provided data. Tools may be implemented to organize data entries and facilitate data review.

SUMMARY

Some embodiments of the present disclosure can be illustrated as a computer system comprising one or more computer processors. The computer system may further comprise one or more computer readable storage media. The computer system may further comprise program instructions stored on the computer readable storage media for execution by at least one of the computer processors. The program instructions may comprise instructions to obtain a set of data entries. The program instructions may further comprise instructions to identify a set of unique terms within the set of data entries. Each unique term of the set of unique terms may have a respective number of instances within the set of data entries. The program instructions may further comprise instructions to determine the respective number of instances for each unique term of the set of unique terms. The program instructions may further comprise instructions to select a first subset of unique terms based on the respective number of instances for each unique term. The program instructions may further comprise instructions to form a set of exclusive groups using each unique term in the first subset. Each exclusive group of the set of exclusive groups may have a respective second number of instances within the set of data entries. The program instructions may further comprise instructions to determine the respective second number of instances for each exclusive group of the set of exclusive groups. The program instructions may further comprise instructions to select a second subset of exclusive groups based on the respective second number of instances for each exclusive group. The program instructions may further comprise instructions to group each term of the second subset of exclusive groups, resulting in a set of distinct terms. The program instructions may further comprise instructions to identify each of the data entries of the set of data entries that includes at least one distinct term of the set of distinct terms. The program instructions may further comprise instructions to group the identified data entries, resulting in a second set of data entries. The program instructions may further comprise instructions to group the at least one distinct term, resulting in a labeling term. The program instructions may further comprise instructions to select a designated first label based on the labeling term. The program instructions may further comprise instructions to assign the designated first label to the second set of data entries.

A computer program product and method corresponding to the above computer system are also disclosed herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data management, more particular aspects relate to generating labels to categorize data. While the present disclosure is not necessarily limited to such applications, various aspects of the disclosure may be appreciated through a discussion of various examples using this context.

Grouping and/or categorizing acquired data may facilitate the review and/or analysis of the data, particularly when large quantities of data are acquired. However, determining effective categories for acquired data may present challenges, as categories that are broad may include too many data elements to aid in distinguishing data, and categories that are narrow may include too few data elements to aid in recognizing data similarities.

To address these and other problems, embodiments of the present disclosure include a method and system for tailored hierarchical label generation. Tailored hierarchical label generation includes generating, based on an analysis of a set of data entries, a first label that may represent a broad category of the data entries and a second label that may represent a narrower subcategory of the data entries. By generating tailored first and second labels, embodiments of the present disclosure may provide improved organization and display of data, which may result in improved efficiency for utilizing the data.

Figure 1:
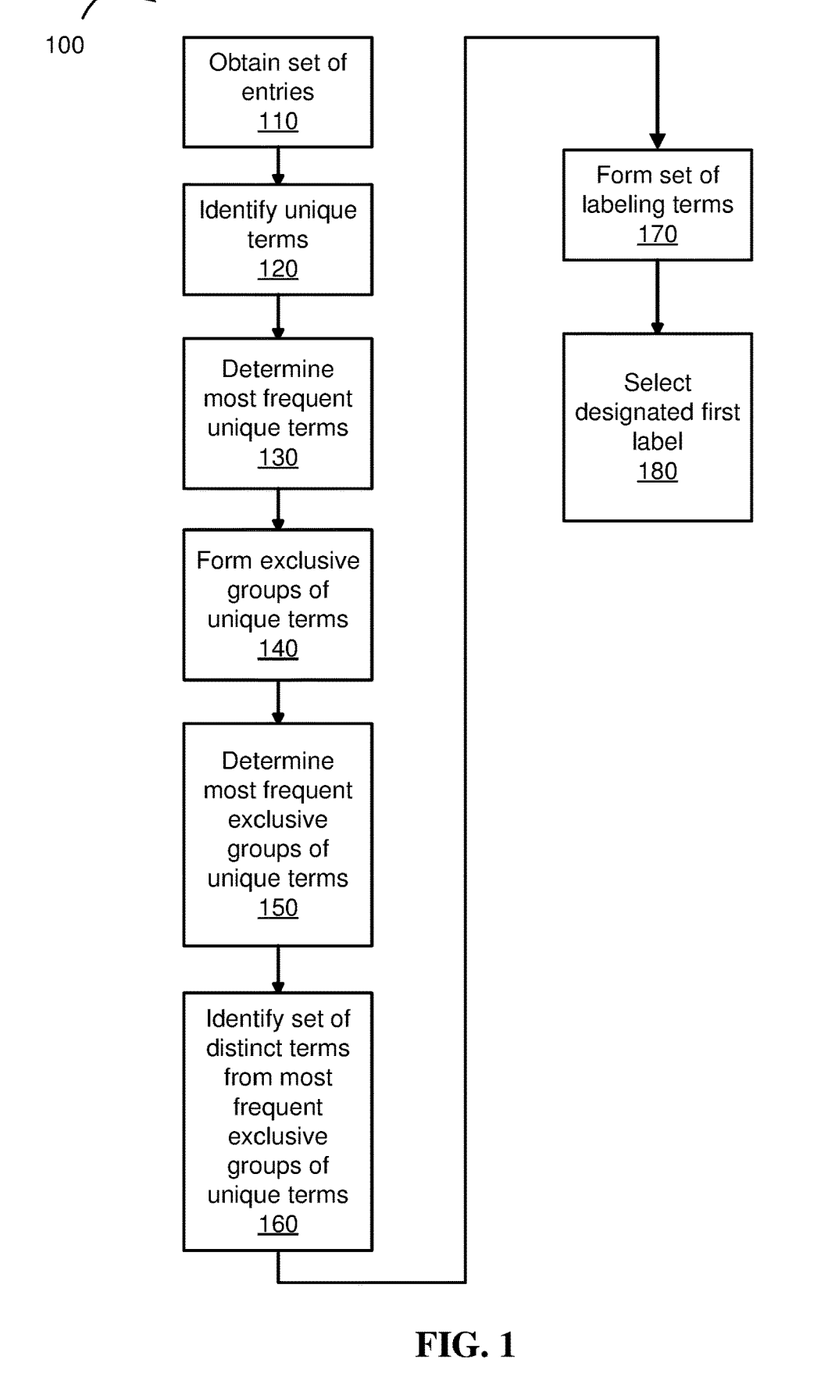
FIG. 1 depicts a flowchart of an example method for generating a first label, according to embodiments of the present disclosure.

Turning to the figures, FIG. 1 illustrates an example method 100 for generating a first label using a system in accordance with the present disclosure. Method 100 may be implemented by a computer system having a processor, such as the computer system disclosed in FIG. 4. In step 110, the system obtains a set of data entries. A data entry may include one or more of alphanumeric characters, special characters, and symbols, that may be used to form terms. A term may be a name, word, or a code, such as an identification code. A data entry may include information such as a list of items, a description, or a summary. For example, in some embodiments, a data entry may include a summary of a technical problem recorded by a help desk technician that is used to create a ticket for technical support. In this example, the data entry may include information such as words to describe a technical problem, names of software and/or hardware, and alphanumeric identification codes that correspond to a user or a user's location. A total set of terms may be an aggregate of the terms within a set of data entries.

The system may obtain the set of data entries by manual input (e.g., by a technician who types or dictates data into the system) or by electronic data transfer (e.g., by downloading one or more files through a computing network).

In step 120 the system identifies unique terms from the set of data entries. A unique term may be a first instance of a term included in the set of data entries. For example, in the data entry, "user reported password problem due to password error message 6.135," the system may identify nine unique terms: user, reported, password, problem, due, to, error, message, 6.135. Although ten terms appear in this example data entry, only the first instance of the two instances of the term "password" would be considered a unique term; thus, the system would identify nine unique terms in the data entry. Continuing with this example, if the set of data entries included a second data entry with the terms "user reported password problem due to password error message 1.378," the system may identify ten unique terms within the set of data entries, as the first instance of the term "1.378" may be considered an additional unique term.

In some embodiments, step 120 may further include disregarding terms such as stop words. A stop word may be one of a set of words that has been predetermined to be excluded from consideration as a unique term. Such stop words may be excluded from consideration by the system because they may occur frequently within a set of data entries but have been deemed to add minimal value to a label. For example, the system may be programmed to recognize words such as articles (e.g., a, an, the) and prepositions (e.g., at, through, to, with) as stop words. Thus, in some embodiments, in the data entry, "user reported password problem due to password error message 6.135," the system may recognize "to" as a stop word and identify eight unique terms in the data entry.

In some embodiments, a set of stop words may be user-defined. For example, a user may recognize that words such as "regards" and "regarding" appear frequently in a set of data entries but would not be helpful in a label. In such embodiments, the user may designate "regards" and "regarding" as stop words so that the system treats them accordingly. In some embodiments, the system may obtain a set of stop words from a source such as a database or a server.

In step 130 the system determines the unique terms that appear with the highest frequency within set of data entries. Step 130 may include the system counting a number of instances of each unique term within the set of data entries, resulting in a frequency value that corresponds to each unique term. The system may then sort the unique terms according to their corresponding frequency values and select a subset of the unique terms having relatively high frequency values. For example, the system may select 10 unique terms having the highest frequency values among a set of 20 unique terms.

In step 140, the system forms a set of exclusive groups of unique terms from the selected subset of high frequency unique terms. Each exclusive group may include one or more unique terms. For example, the system may form a set of exclusive two-term pairs by selecting a mathematical combination of term pairs from the selected subset of high frequency unique terms. For example, in some embodiments, the system may form exclusive groups that are two-term pairs from a subset of four high frequency unique terms, "A," "B," "C," and "D." In this example, the two-term pairs may be selected without regard for the order of the terms and without repetition, resulting in 6 two-term pairs: "A B," "A C," "A D," "B C," "B D," and "C D."

In step 150, the system determines the exclusive groups of unique terms (e.g., a set of exclusive two-term pairs) that appear with the highest frequency within the set of data entries. Step 150 may include counting the number of data entries in which an exclusive group is present and dividing that number by the total number of data entries, resulting in frequency value that corresponds to the exclusive group. The system may then sort the exclusive groups according to their corresponding frequency values and select a subset of exclusive groups that appears most frequently within the set of data entries (i.e., the exclusive groups having relatively frequency values).

In step 160, the system identifies each term of the selected subset of exclusive groups and categorizes those terms as distinct terms. For example, if the selected subset of exclusive groups included the exclusive two-term pairs "(login, error); (password, error); (login, issue)," then the system would identify the terms "login," "error," "password," and "issue," and it would categorize those terms as distinct terms.

In step 170, the system forms a labeling term for each data entry of the set of data entries. A labeling term corresponding to a data entry is formed by grouping all of the distinct terms that appear in the data entry. For example, continuing with the example above, if the only distinct terms appearing in a first data entry were "password" and "issue," then the labeling term for the first data entry would be "password issue." If the only distinct term appearing in a second data entry was "login," then the labeling term for the second data entry would be "login."

In step 180, the system selects, for each data entry of the set of data entries, a designated first label based on the labeling terms formed in step 170. For example, if a labeling term corresponding to a data entry included only one distinct term, then the system would select that distinct term as a designated first label for the corresponding data entry. However, if a labeling term corresponding to a data entry included more than one distinct term, then the system may select a designated first label from a set of ordered combinations of the distinct terms.

For example, if a labeling term was "A B C," where each of "A," "B," and "C" was a distinct term, the system may form a corresponding set of six ordered combinations: "A B C;" "A C B;" "B A C;" "B C A;" "C A B;" and "C B A." The system may then determine which of the ordered combinations appears most frequently in the set of data entries and select the most frequently appearing ordered combination as a designated first label. For example, the ordered combination "A B C" may appear in 10 of 12 data entries, and the ordered combination "B A C" may appear in 2 of 12 data entries; thus, the system would select the most frequently appearing ordered combination, "A B C," as a designated first label. That designated first label would be assigned to all 12 of the data entries because all 12 of the data entries included the distinct terms A, B, and C.

In some embodiments, for a set of data entries, step 170 may result in data entries that lack any of the distinct terms identified in step 160. For example, for a set of 10 data entries, five of the data entries may include one or more distinct terms, and the remaining five data entries may not include any distinct terms. Accordingly, no designated first labels would be generated for those remaining five data entries. In such embodiments, the system may identify a subset of data entries that includes those remaining five data entries and perform a second cycle of steps 120 through 180 to generate designated first labels for the remaining five data entries. Furthermore, if the second cycle resulted in remaining data entries that lacked distinct terms that were identified in the second cycle, then the system may identify further sets of data entries and perform further cycles of steps 120 through 180 to generate designated first labels, respectively for the remaining sets of data entries. The further cycles may be repeated until a threshold number of cycles was reached or until a threshold percentage of data entries were assigned designated first labels.

Figure 2:
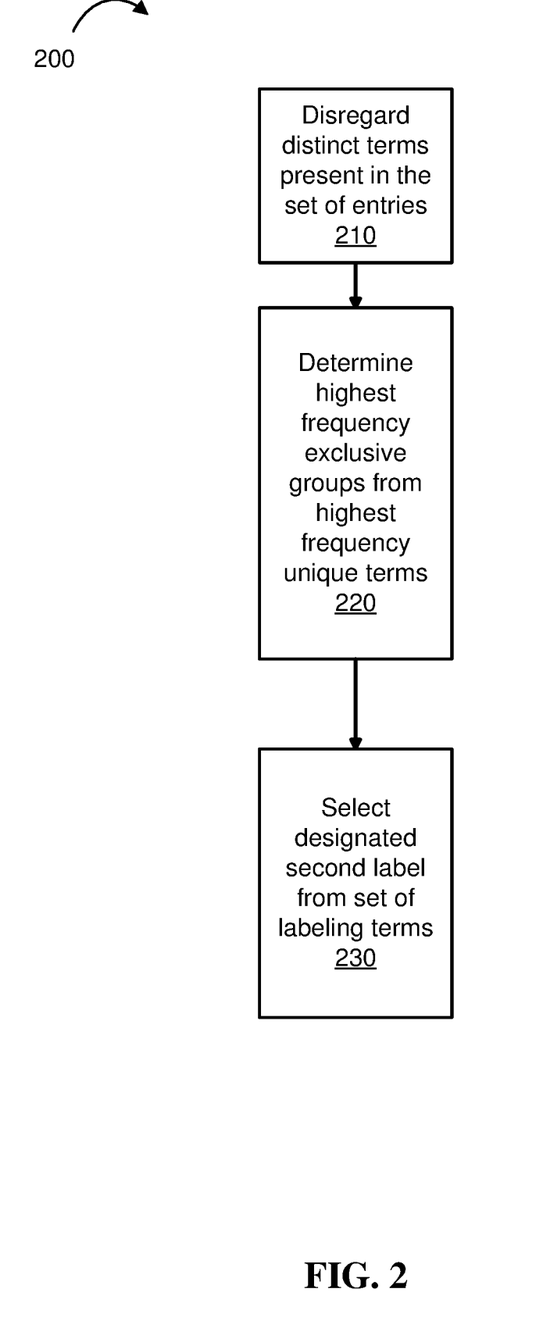
FIG. 2 depicts a flowchart of an example method for generating a second label, according to embodiments of the present disclosure.

FIG. 2 illustrates an example method 200 of selecting a designated second label for each data entry of the set of data entries obtained in step 110. Method 200 may be implemented by a computer system having a processor, such as the computer system disclosed in FIG. 4. Method 200 may follow method 100. Method 200 may include steps that are identical or substantially similar to method 100, but that may occur after disregarding the distinct terms identified in method 100. For example, if method 100 determined that the terms "login," "error," "password," and "issue," were distinct terms, then method 200 would first disregard those terms and then proceed with steps identical or substantially similar to those in method 100. Particularly, step 220, discussed below, may be analogous to steps 120-150 of method 100, and step 230 may be analogous to steps 160-180 of method 100, where method 200 generates designated second labels.

In step 210, the system may disregard distinct terms that were identified while selecting a designated first label (e.g., through a method analogous to method 100) and that are present in the set of data entries. For example, in some embodiments, the system may treat such distinct terms as stop words or remove the distinct terms from the set of data entries before performing other steps of method 200. Step 210 may also include disregarding other stop words from the set of data entries, such as the stop words included in the discussion of step 120 of FIG. 1 above.

In step 220, the system identifies a set of unique terms included in the set of data entries. The system may then determine a subset of unique terms that appear with the highest frequency within the set of data entries and form a set of exclusive groups of unique terms from that subset. The system may then determine which of the exclusive groups appear with the highest frequency within the set of data entries and form a subset of those exclusive groups.

In step 230, from the subset of exclusive groups appearing with the highest frequency within the set of data entries, the system may identify each term included in the subset and categorize each term as a distinct term. The system may then determine a set of one or more labeling terms from the distinct terms. Then, the system may designate a second label from the set of one or more labeling terms.

FIGS. 3A-3F illustrate example data inputs and data outputs generated during an example application of a method according to the present disclosure. In this example application, a designated first label and a designated second label shown in FIG. 3H are generated for the set of 12 data entries shown in FIG. 3A. The tables shown in FIGS. 3B-3H include outputs that may be generated during steps of the example method when applied to the set of 12 data entries shown in FIG. 3A.

Figures 3A, 3B:
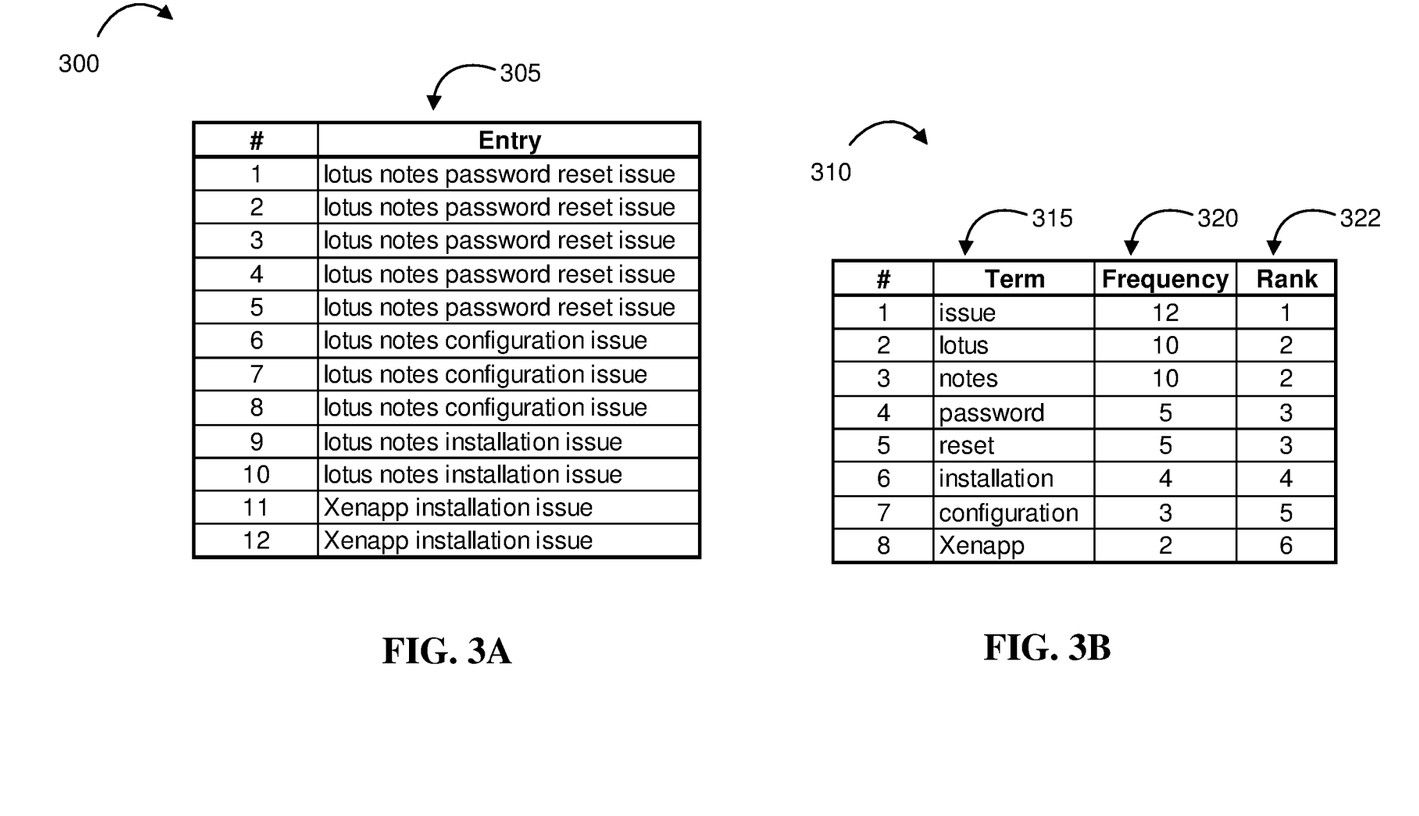
FIG. 3A depicts an example table of data entries, according to embodiments of the present disclosure.
FIG. 3B depicts an example table of unique terms, according to embodiments of the present disclosure.

FIG. 3A illustrates an example table 300 that includes a set of 12 data entries 305. Table 300 may correspond to some embodiments of step 110 in FIG. 1. The set of 12 data entries 305 may represent a first cluster (i.e., a subset of a total set of data entries). For example, a total set of data entries may include 120 data entries divided into 10 clusters, and each cluster may include 12 data entries. Data entries 305 include brief descriptions of technical problems. The descriptions may have been entered into a database by a resource, such as a help desk technician, in response to 12 phone calls for technical support from users of a computer network.

FIG. 3B illustrates an example output table 310 that includes a set of unique terms 315 identified from the set of data entries 305. Table 310 may correspond to some embodiments of steps 120 and 130 of FIG. 1. Table 310 also includes a set of frequencies 320 that corresponds, respectively, to the set of unique terms 315. Each frequency of the set of frequencies 320 represents a number of instances of a corresponding unique term in the set of data entries 305. For example, table 310 indicates that the unique term "issue" has 12 instances (i.e., is present 12 times) in the set of data entries 305.

FIG. 3B additionally shows a set of numerical ranks 322 assigned, respectively, to the set of unique terms 315. Each numerical rank is assigned to a unique term based on the unique term's frequency. For example, in FIG. 3B, the highest numerical rank, "1" is assigned to the unique term "issue" based on "issue" having the highest frequency (12) of the set of unique terms 315. The second highest numerical rank, "2" is assigned to the unique terms "lotus" and "notes" based on those terms each having the second highest frequency (10) of the set of unique terms.

In some embodiments, the system may select a subset of unique terms based on each unique term's frequency and/or numerical rank. For example, in some embodiments, the system may select a subset of unique terms having the five highest frequencies by comparing each unique term's numerical rank to a threshold rank, such as a preselected threshold rank of 6. In this example, the system would select the unique terms having a numerical rank that exceeded 6 (i.e., unique terms having a numerical rank of 1, 2, 3, 4, or 5).

Figure 3C:
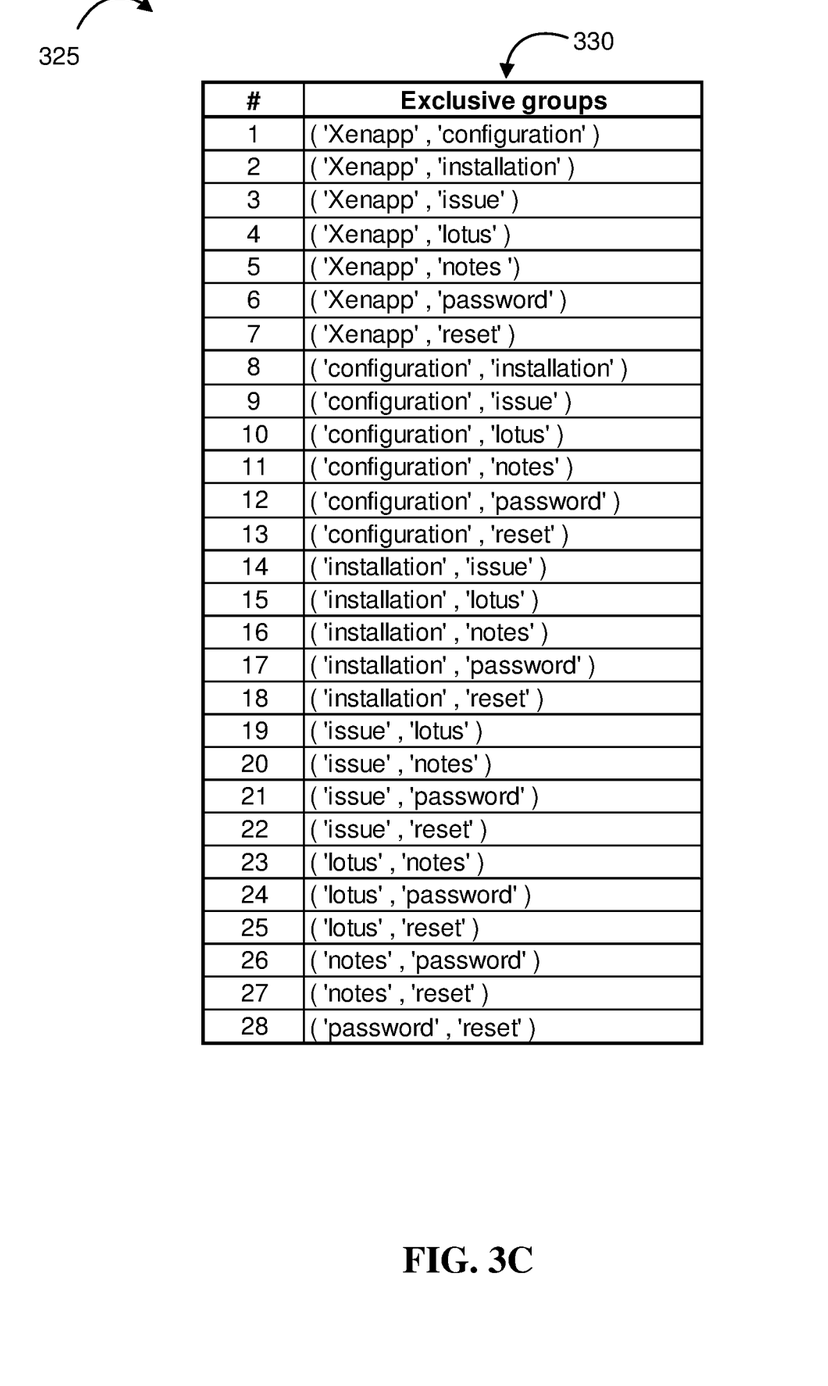
FIG. 3C depicts an example table of exclusive groups, according to embodiments of the present disclosure.

FIG. 3C illustrates an example output table 325 that includes a set of 28 exclusive groups of unique terms 330 generated from the set of unique terms 315. Table 325 may correspond to some embodiments of step 140 of FIG. 1. In this example, the exclusive groups of unique terms are two-term pairs that are generated by forming every possible two-term combination of unique terms without repetition and without regard to order. For example, if a first selected unique term is "issue," then seven two-term pairs (shown in rows 3, 9, 14, 19, 20, 21, and 22 of table 325) may be formed by selecting each of the remaining unique terms as the second selected unique term. In this example, the number of possible two-term combinations may be calculated using the mathematical notation $C(8,2)$.

Figure 3D:
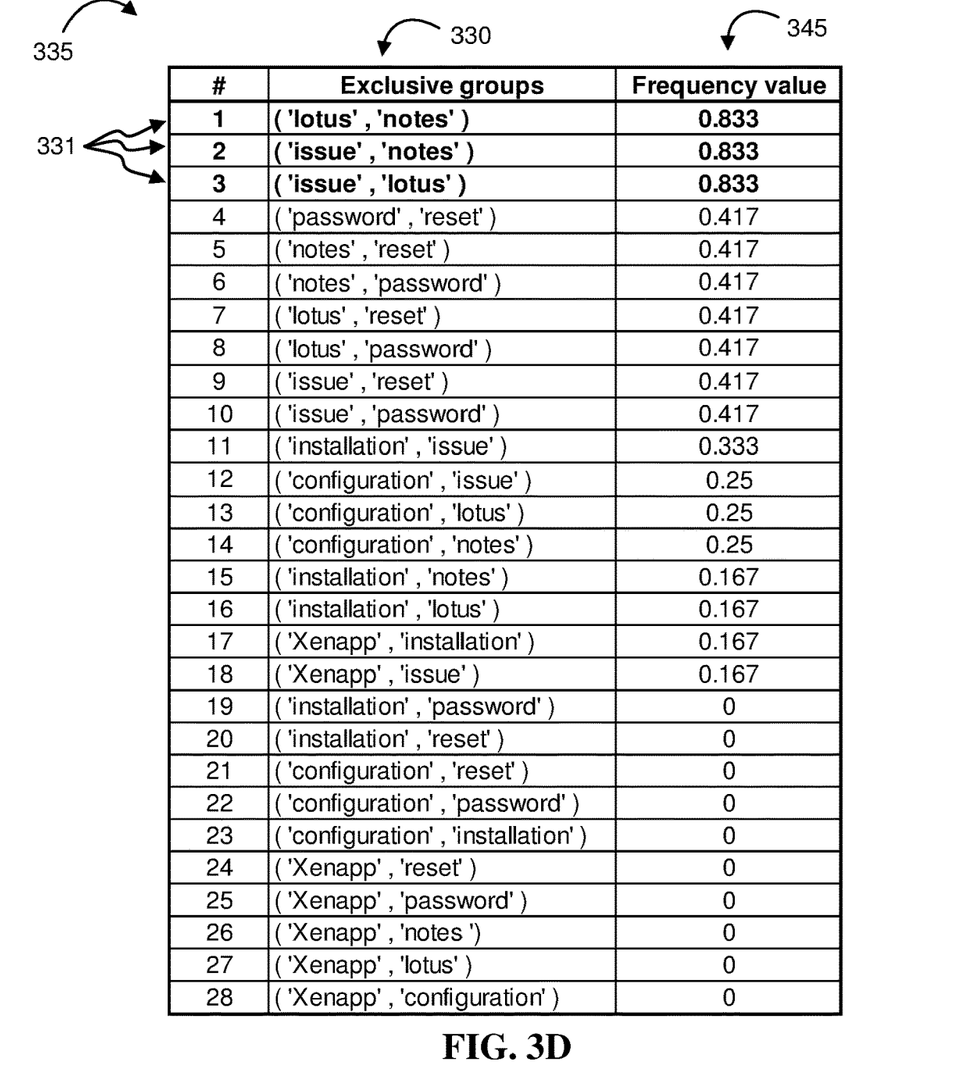
FIG. 3D depicts an example table of exclusive groups, sorted according to frequency values, according to embodiments of the present disclosure.

FIG. 3D illustrates an example output table 335 that includes the set of exclusive groups of unique terms 330 that were shown in table 325 sorted according to a corresponding set of respective frequency values 345. Table 335 may correspond to some embodiments of step 150 of FIG. 1. Each of the frequency values 345 is calculated by counting the number of data entries in which the corresponding exclusive group of unique terms is present and dividing that number by the total number of data entries. For example, the frequency value ("0.833") of row 1 of table 335 is calculated by first counting the number of data entries of the set of data entries 305 that include the term "lotus" and the term "notes" (10 data entries in the set of data entries 305 include both of those terms). Next, that number (10) is divided by the total number of data entries (12), resulting in the frequency value ("0.833").

FIG. 3D further illustrates a selection of the three groups 331 of unique terms that appear with the highest frequencies within the set of data entries. Such a selection may be based on ranking the set of exclusive groups 330 and performing a threshold comparison, similar to the steps described for FIG. 3B above.

Figure 3E:
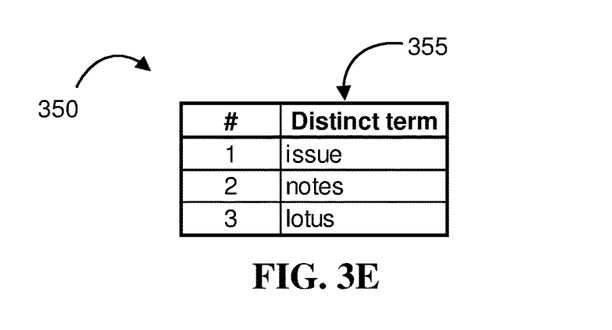
FIG. 3E depicts an example table of distinct terms, according to embodiments of the present disclosure.

FIG. 3E illustrates an example output table 350 that includes each term of the three groups 331 of unique terms that were determined to appear with the highest frequencies within the set of data entries. These terms are categorized as distinct terms 355. Table 350 may correspond to some embodiments of step 160 of FIG. 1.

Figures 3F, 3G:
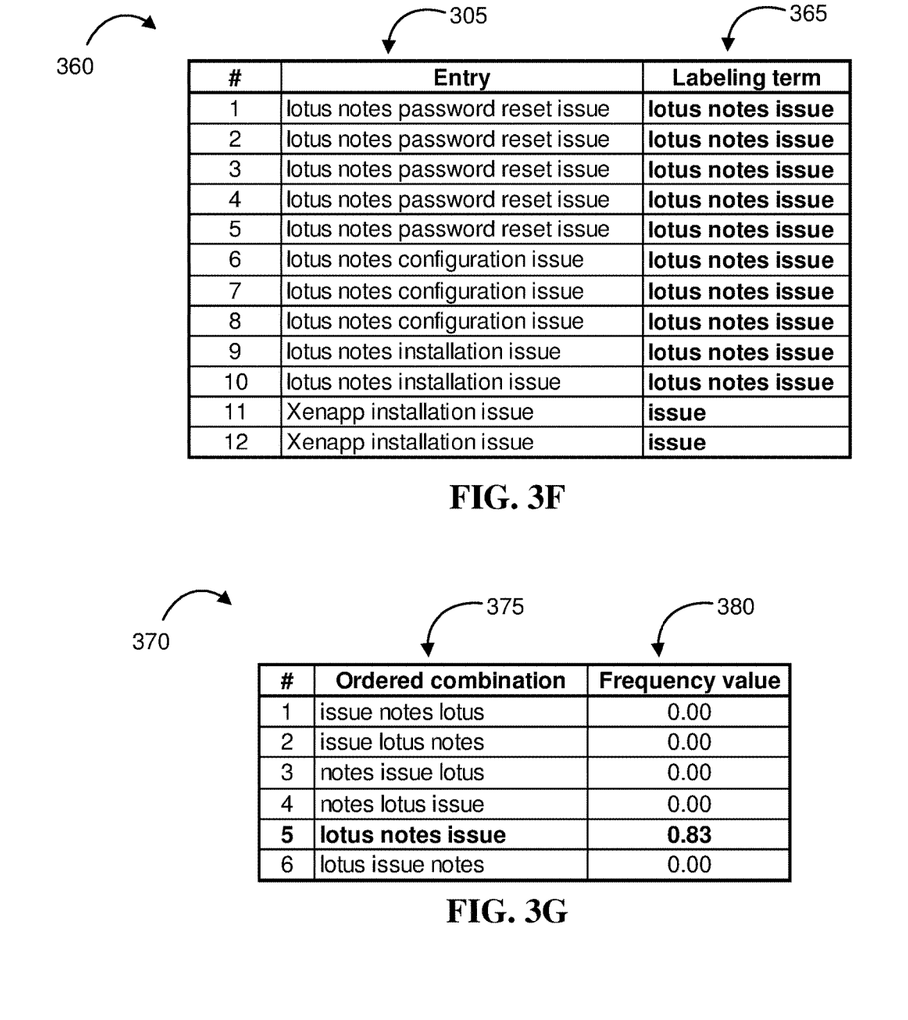
FIG. 3F depicts an example table of labeling terms, according to embodiments of the present disclosure.
FIG. 3G depicts an example table of ordered combinations of distinct terms, according to embodiments of the present disclosure.
Figure 3H:
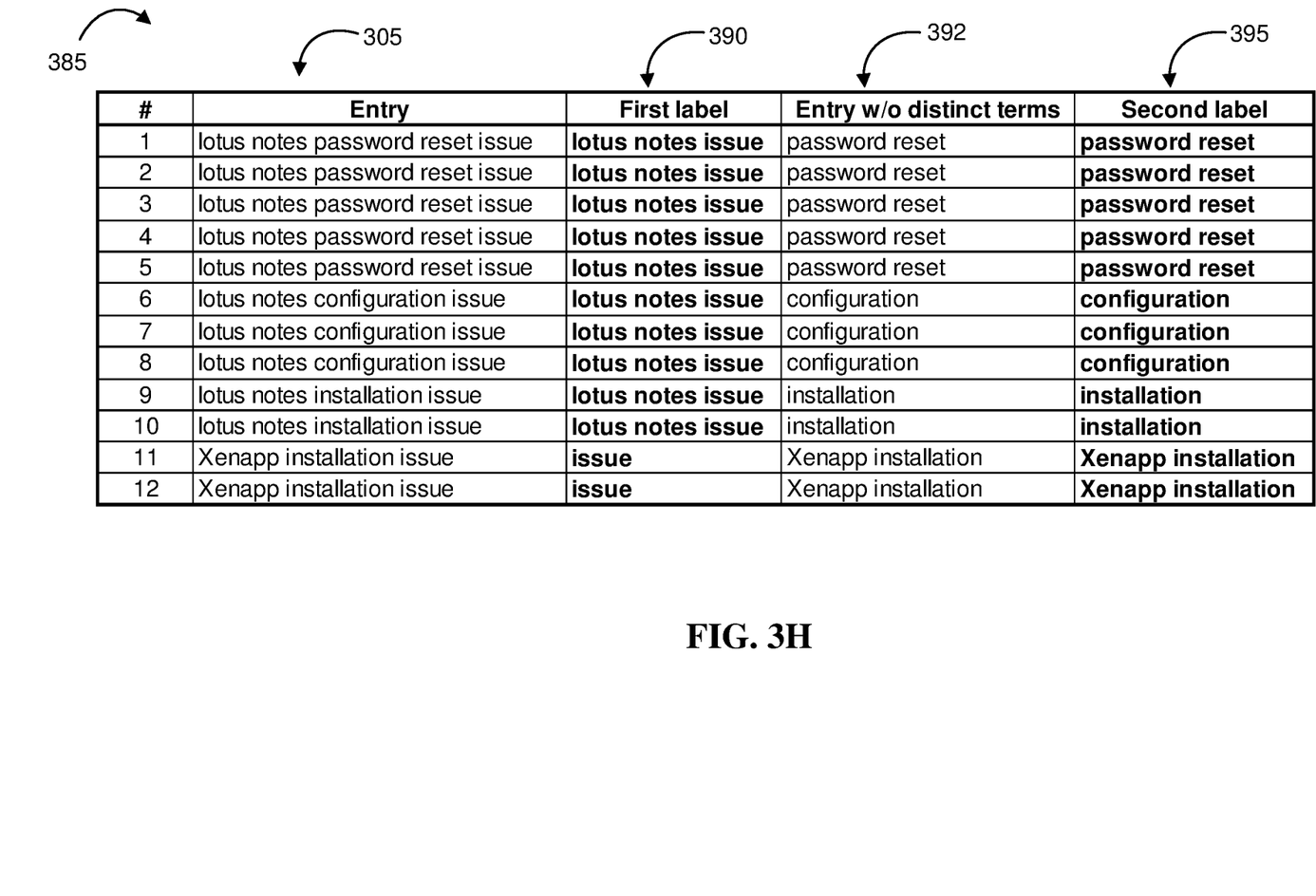
FIG. 3H depicts an example table of first and second labels, according to embodiments of the present disclosure.

FIG. 3F illustrates an example output table 360 that includes labeling terms 365 for each data entry of the set of data entries 305. Table 360 may correspond to some embodiments of step 170 of FIG. 1. Labeling terms 365 have been determined for each data entry by grouping all of the distinct terms 355 that appear in the data entry. Thus, as shown in FIG. 3F, the labeling terms corresponding to each of the first 10 data entries include all three distinct terms 355 because each of the first 10 data entries includes the terms "lotus," "notes," and "issue." However, the labeling terms corresponding to data entries on rows 11 and 12 include only one of the three distinct terms 355 because each of those data entries includes only the distinct term "issue."

FIG. 3G illustrates an example output table 370 of ordered combinations 375 of distinct terms 380. Table 380 may correspond to some embodiments of step 180 of FIG. 1 in the case where a labeling term corresponding to a data entry includes more than one distinct term. Since each of the labeling terms corresponding to the data entries in rows 1-10 includes more than one distinct term, the system determines the sequence of the distinct terms that is most frequently used in the set of data entries 305. The system obtains the set of ordered combinations 375, without repetition, from the distinct terms appearing in the labeling terms in rows 1-10. The system also obtains a set of frequency values 380, and each frequency value corresponds to an ordered combination in the set of ordered combinations 375; each frequency value represents the number of times the corresponding ordered combination appears in the set of data entries 305. In FIG. 3G, the frequency value is calculated by dividing the number of times the ordered combination appears in the set of data entries 305 divided by the total number of data entries. Thus, for the ordered combination in row 5, the corresponding frequency value equals $10/12$.

FIG. 3H illustrates an example output table of designated first labels 390 and second labels 395. Table 385 may correspond to some embodiments of step 180 of FIG. 1 and step 230 of FIG. 2. The ordered combination in row 5 of FIG. 3G was selected as the designated first label 390 for the data entries in rows 1-10 of FIG. 3H because the ordered combination "lotus notes issue" was the most frequently used sequence of distinct terms in the set of data entries 305. The designated first label "issue" was selected for the data entries in rows 11-12 of FIG. 3H because "issue" was the only distinct term that appeared in those data entries.

FIG. 3H further illustrates a set of redacted data entries 392 in which all of the distinct terms 355 have been removed from the set of data entries 305. The set of designated second labels 395 may be generated by performing method 200 of FIG. 2.

By generating a set of first designated labels and a set of second designated labels, the system may facilitate a review of the data entries by providing both a general category (first designated label) and a focused category (second designated label) for each data entry.

Figure 4:
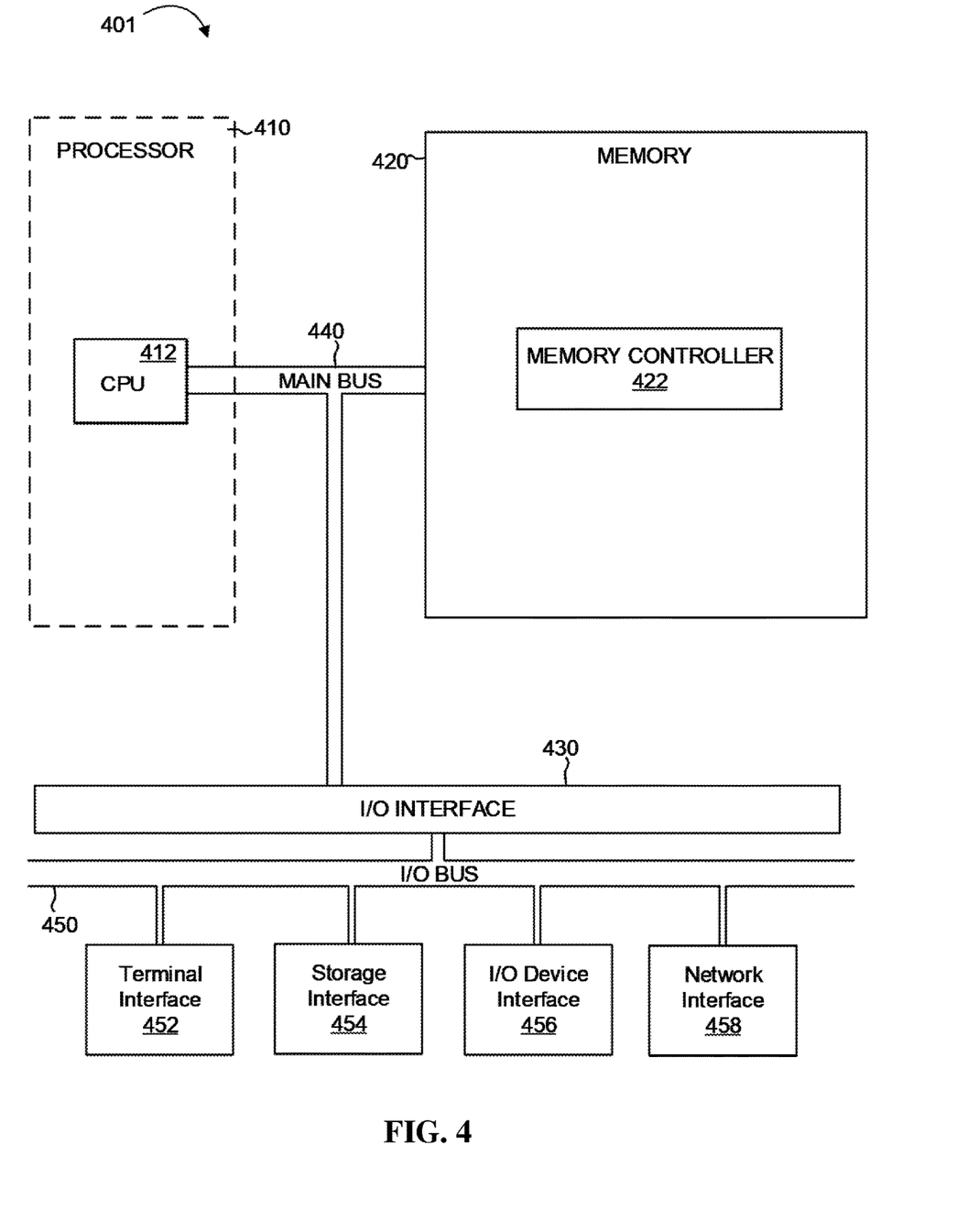
FIG. 4 depicts the representative major components of a computer system that may be used in accordance with embodiments of the present disclosure.

FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420.

The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by a processor, a set of data entries;
identifying, by the processor, a set of unique terms within the set of data entries, each unique term of the set of unique terms having a respective number of instances within the set of data entries;
determining, by the processor, the respective number of instances for each unique term of the set of unique terms;
selecting, by the processor, a first subset of unique terms based on the respective number of instances for each unique term;
forming, by the processor, a set of exclusive groups using each unique term in the first subset, each exclusive group of the set of exclusive groups having a respective second number of instances within the set of data entries;
determining, by the processor, the respective second number of instances for each exclusive group of the set of exclusive groups;
selecting, by the processor, a second subset of exclusive groups based on the respective second number of instances for each exclusive group;
grouping, by the processor, each term of the second subset of exclusive groups, resulting in a set of distinct terms;
identifying, by the processor, each of the data entries of the set of data entries that includes at least one distinct term of the set of distinct terms;
grouping, by the processor, the identified data entries, resulting in a second set of data entries;
grouping, by the processor, the at least one distinct term, resulting in a labeling term;
selecting, by the processor, a designated first label based on the labeling term; and
assigning, by the processor, the designated first label to the second set of data entries.

2. The method of claim 1, further comprising identifying, by the processor, a third set of data entries of the set of data entries, wherein the third set of data entries does not include at least one distinct term of the set of distinct terms;
generating, by the processor, a second designated first label; and
assigning, by the processor, the second designated first label to the third set of data entries.

3. The method of claim 1, wherein selecting a designated first label comprises:
forming, by the processor, a set of ordered combinations using each term of the labeling term, each ordered combination of the set of ordered combinations having a respective third number of instances within the set of data entries;
determining, by the processor, the respective third number of instances for each ordered combination of the set of ordered combinations; and
selecting, by the processor, an ordered combination corresponding to the highest third number of instances as the designated first label.

4. The method of claim 1, wherein the at least one distinct term comprises one distinct term, and the one distinct term is selected as the designated first label.

5. The method of claim 1, wherein each exclusive group comprises a two-term pair.

6. The method of claim 1, further comprising assigning, by the processor, a respective numerical rank to each unique term of the set of unique terms, wherein the respective numerical rank for each unique term corresponds to the respective number of instances for each unique term; and
wherein each of the unique terms in the first subset of unique terms is selected based on having a respective numerical rank that exceeds a preselected threshold.

7. The method of claim 1, further comprising assigning, by the processor, a respective second numerical rank to each exclusive group of the set of exclusive groups,
wherein the respective second numerical rank for each exclusive group corresponds to the respective second number of instances for each exclusive group; and
wherein each of the exclusive groups in the second subset of exclusive groups has a respective second numerical rank that exceeds a second preselected threshold.

8. The method of claim 1, further comprising, removing, by the processor, each instance of each distinct term of the set of data entries, resulting in a redacted set of data entries;
identifying, by the processor, a second set of unique terms within the redacted set of data entries, each unique term of the second set of unique terms having a respective third number of instances within the redacted set of data entries;
determining, by the processor, the respective third number of instances for each unique term of the second set of unique terms;
selecting, by the processor, a third subset of unique terms based on the respective third number of instances for each unique term;
forming, by the processor, a second set of exclusive groups using each unique term in the third subset, each exclusive group of the second set of exclusive groups having a respective fourth number of instances within the redacted set of data entries;
determining, by the processor, the respective fourth number of instances for each exclusive group of the second set of exclusive groups;
selecting, by the processor, a fourth subset of exclusive groups based on the respective fourth number of instances for each exclusive group;
grouping, by the processor, each term of the fourth subset of exclusive groups, resulting in a second set of distinct terms;

identifying, by the processor, each of the redacted data entries of the redacted set of data entries that includes at least one distinct term of the second set of distinct terms;

grouping, by the processor, the identified redacted data entries, resulting in a second set of redacted data entries;

grouping, by the processor, the at least one distinct term, resulting in a second labeling term;

selecting, by the processor, a designated second label based on the second labeling term; and assigning, by the processor, the designated second label to the second set of redacted data entries.

9. The method of claim 8, wherein selecting a designated second label comprises: forming, by the processor, a second set of ordered combinations using each term of the labeling term, each ordered combination of the set of ordered combinations having a respective third number of instances within the set of data entries;

determining, by the processor, the respective third number of instances for each ordered combination of the set of ordered combinations; and selecting, by the processor, an ordered combination corresponding to the highest third number of instances as the designated second label.

10. A computer system comprising:
one or more computer processors;
one or more computer readable storage media;
program instructions stored on the computer readable storage media for execution by at least one of the computer processors, the program instructions comprising instructions to:
obtain a set of data entries comprising a set of descriptions of one or more technical problems, the set of descriptions corresponding to one or more technical support requests from users of a computer network;
identify a set of unique terms within the set of data entries, each unique term of the set of unique terms having a respective number of instances within the set of data entries;
determine the respective number of instances for each unique term of the set of unique terms;
select a first subset of unique terms based on the respective number of instances for each unique term;
form a set of exclusive groups using each unique term in the first subset, each exclusive group of the set of exclusive groups having a respective second number of instances within the set of data entries;
determine the respective second number of instances for each exclusive group of the set of exclusive groups;
select a second subset of exclusive groups based on the respective second number of instances for each exclusive group;
group each term of the second subset of exclusive groups, resulting in a set of distinct terms;
identify each of the data entries of the set of data entries that includes at least one distinct term of the set of distinct terms;
group the identified data entries, resulting in a second set of data entries;
group the at least one distinct term, resulting in a labeling term;
select a designated first label based on the labeling term;
assign the designated first label to the second set of data entries; and
display a table comprising the first designated label adjacent to the second set of data entries.

11. The computer system of claim 10, wherein the program instructions further comprise instructions to:
identify a third set of data entries of the set of data entries, wherein the third set of data entries does not include at least one distinct term of the set of distinct terms;
generate a second designated first label; and
assign the second designated first label to the third set of data entries.

12. The computer system of claim 10, wherein selecting a designated first label comprises:
forming a set of ordered combinations using each term of the labeling term, each ordered combination of the set of ordered combinations having a respective third number of instances within the set of data entries;
determining the respective third number of instances for each ordered combination of the set of ordered combinations; and
selecting an ordered combination corresponding to the highest third number of instances as the designated first label.

13. The computer system of claim 10, wherein each exclusive group comprises a two-term pair.

14. The computer system of claim 10, wherein the program instructions further comprise instructions to:
assign a respective numerical rank to each unique term of the set of unique terms,
wherein the respective numerical rank for each unique term corresponds to the respective number of instances for each unique term; and
wherein each of the unique terms in the first subset of unique terms is selected based on having a respective numerical rank that exceeds a preselected threshold.

15. The computer system of claim 10, wherein the program instructions further comprise instructions to:
remove each instance of each distinct term of the set of data entries, resulting in a redacted set of data entries;
identify a second set of unique terms within the redacted set of data entries, each unique term of the second set of unique terms having a respective third number of instances within the redacted set of data entries;
determine the respective third number of instances for each unique term of the second set of unique terms;
select a third subset of unique terms based on the respective third number of instances for each unique term;
form a second set of exclusive groups using each unique term in the third subset, each exclusive group of the second set of exclusive groups having a respective fourth number of instances within the redacted set of data entries;
determine the respective fourth number of instances for each exclusive group of the second set of exclusive groups;
select a fourth subset of exclusive groups based on the respective fourth number of instances for each exclusive group;
group each term of the fourth subset of exclusive groups, resulting in a second set of distinct terms;
identify each of the redacted data entries of the redacted set of data entries that includes at least one distinct term of the second set of distinct terms;
group the identified redacted data entries, resulting in a second set of redacted data entries;
group the at least one distinct term, resulting in a second labeling term;
select a designated second label based on the second labeling term; and assign the designated second label to the second set of redacted data entries.

16. The computer system of claim 15, wherein selecting a designated second label comprises: forming a second set of ordered combinations using each term of the labeling term, each ordered combination of the set of ordered combinations having a respective third number of instances within the set of data entries;
   determining the respective third number of instances for each ordered combination of the set of ordered combinations; and
   selecting an ordered combination corresponding to the highest third number of instances as the designated second label.

17. A computer program product comprising:
   one or more computer readable storage media and program instructions stored on the one or more computer readable storage media, the program instructions comprising instructions to:
   obtain a set of data entries comprising a set of descriptions of one or more technical problems, the set of descriptions corresponding to one or more technical support requests from users of a computer network;
   identify a set of unique terms within the set of data entries, each unique term of the set of unique terms having a respective number of instances within the set of data entries;
   determine the respective number of instances for each unique term of the set of unique terms;
   select a first subset of unique terms based on the respective number of instances for each unique term;
   form a set of exclusive groups using each unique term in the first subset, each exclusive group of the set of exclusive groups having a respective second number of instances within the set of data entries;
   determine the respective second number of instances for each exclusive group of the set of exclusive groups;
   select a second subset of exclusive groups based on the respective second number of instances for each exclusive group;
   group each term of the second subset of exclusive groups, resulting in a set of distinct terms;
   identify each of the data entries of the set of data entries that includes at least one distinct term of the set of distinct terms;
   group the identified data entries, resulting in a second set of data entries;
   group the at least one distinct term, resulting in a labeling term;
   select a designated first label based on the labeling term;
   assign the designated first label to the second set of data entries; and
   display a table comprising the first designated label adjacent to the second set of data entries.

18. The computer program product of claim 17, wherein each exclusive group comprises a two-term pair.

19. The computer program product of claim 17, wherein the program instructions further comprise instructions to:
   remove each instance of each distinct term of the set of data entries, resulting in a redacted set of data entries;
   identify a second set of unique terms within the redacted set of data entries, each unique term of the second set of unique terms having a respective third number of instances within the redacted set of data entries;
   determine the respective third number of instances for each unique term of the second set of unique terms;
   select a third subset of unique terms based on the respective third number of instances for each unique term;
   form a second set of exclusive groups using each unique term in the third subset, each exclusive group of the second set of exclusive groups having a respective fourth number of instances within the redacted set of data entries;
   determine the respective fourth number of instances for each exclusive group of the second set of exclusive groups;
   select a fourth subset of exclusive groups based on the respective fourth number of instances for each exclusive group;
   group each term of the fourth subset of exclusive groups, resulting in a second set of distinct terms;
   identify each of the redacted data entries of the redacted set of data entries that includes at least one distinct term of the second set of distinct terms;
   group the identified redacted data entries, resulting in a second set of redacted data entries;
   group the at least one distinct term, resulting in a second labeling term;
   select a designated second label based on the second labeling term; and
   assign the designated second label to the second set of redacted data entries.

20. The computer program product of claim 19, wherein selecting a designated second label comprises:
   forming a second set of ordered combinations using each term of the labeling term, each ordered combination of the set of ordered combinations having a respective third number of instances within the set of data entries;
   determining the respective third number of instances for each ordered combination of the set of ordered combinations; and
   selecting an ordered combination corresponding to the highest third number of instances as the designated second label.

* * * * *